(12) United States Patent
Saiyed et al.

(10) Patent No.: US 7,500,237 B1
(45) Date of Patent: Mar. 3, 2009

(54) INSTALLATION BUILDER INTEGRATED DEVELOPMENT ENVIRONMENT

(75) Inventors: Junaid A. Saiyed, Sunnyvale, CA (US); Eric Nielsen, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 799 days.

(21) Appl. No.: 10/919,095

(22) Filed: Aug. 16, 2004

(51) Int. Cl.
*G06F 9/45* (2006.01)

(52) U.S. Cl. ...................................... 717/174

(58) Field of Classification Search ................. 717/174, 717/169
See application file for complete search history.

(56) References Cited

U.S. PATENT DOCUMENTS

2002/0047863 A1* 4/2002 Hyman ........................ 345/744
2003/0037322 A1* 2/2003 Kodosky et al. ............. 717/162
2003/0184580 A1* 10/2003 Kodosky et al. ............. 345/734
2005/0065970 A1* 3/2005 King et al. ................... 707/102

OTHER PUBLICATIONS

*Open Specification License*; Manual; Aug. 15, 2002; 130 pp.; Application Installation (JSR-38) Specification, Version 1.2; USA.
*Jifi Installer Builder User Guide for Version 1.2*; User Guide; Jun. 26, 2003; 126 pp.; Document Version 3; Jet Propulsion Laboratory; Pasadena, CA USA.
*InstallAnywhere*; Manual; 113 pp.; Version 6; 1997; USA.
Dave Neuendorf, Richard Wiener; *InstallAnywhere, InstallShield Multiplatform and InstallShield Developer*; Journal of Object Technology; vol. 1, No. 2, pp. 175-181; 2002. http://www.jot.fm/products/review2.

* cited by examiner

*Primary Examiner*—John Chavis
(74) *Attorney, Agent, or Firm*—Osha • Liang LLP

(57) ABSTRACT

A method for creating an install program involves selecting a plurality of icons (where each of the plurality of icons represents an element of the install program), defining the install program by placing and arranging the plurality of icons onto a workspace to obtain a defined install program, and building the install program based on the defined install program.

9 Claims, 4 Drawing Sheets

INSTALLATION BUILDER INTEGRATED DEVELOPMENT ENVIRONMENT

BACKGROUND

An install program is a software program that assists a user with the installation of an application program on a computer such that the application program works correctly with the computer's environment including the operating system. An installation builder is a software program that assists a programmer in the generation of install programs. There are many commercially available installation builders, including InstallAnywhere™ sold by Zero G Software, Inc. and InstallShield Multiplatform™ sold by InstallShield Software Corporation. InstallAnywhere™ is a trademark of Zero G Software, Inc. and InstallShield Multiplatform™ is a trademark of InstallShield Software Corporation.

A typical install program leads the user through the steps of installing an application by presenting the user with a series of screens or panels. These panels may include an initial welcome panel incorporating a marketing splash screen and showing the name and version of the application to be installed, a panel for selecting the components to be installed, a panel describing the installation requirements of the selected components, a panel for selecting the directory where the selected components are to be installed, a panel displaying the license for the application, etc. As the user proceeds through the panels, interactive actions and rules (i.e., checks) operate behind the scenes to manage the flow of the installation process and to implement various installation operations.

Actions are essentially executable procedures performed by the install program. Generally, each action is controlled by a rule or check, which determines whether the action is executed or not. An action may be as simple as installing files or as sophisticated as executing custom code during the installation process. Example actions include creating a directory, moving a file, requesting a password, etc.

Rules or checks are logical evaluators (i.e., return True or False when evaluated) used with actions and panels. The rules are attached to actions and panels and are executed to manage the flow of the install program. For example, a rule may be executed to determine whether a directory exists prior to allowing an action to install files in the directory.

In general, an installation builder allows a programmer to create an install program using a series of menus and tabs. Typically, the programmer clicks on the individual tabs or menus and answers the questions presented. The programmer does not see the impact of answering these questions on the resulting install program until the install program is generated and executed.

The process to create an install program concentrates on the individual elements of the install program, e.g. panels, actions, and rules. For example, a programmer can manipulate the look and feel of a panel through a series of menus and tabs or provide a parameter to a create file action. The programmer is unable to manipulate and view how these individual elements would interact in the resulting install program prior to building (i.e., compiling or interpreting) the install program.

In general, installation builders are designed to generate install programs that install an application or group of applications on a single computer. Creating more complex install programs, such as for enterprise applications that execute on multiple servers, can provide challenges not encountered for single computers.

SUMMARY

In general, in one aspect, the invention relates to a method for creating an install program. The method involves selecting a plurality of icons (wherein each of the plurality of icons represents an element of the install program), defining the install program by placing and arranging the plurality of icons onto a workspace to obtain a defined install program, and building the install program based on the defined install program.

In general, in one aspect, the invention relates to a computer-readable medium. The computer-readable medium includes instructions recorded thereon executable by a processor to create an install program, the instructions for selecting a plurality of icons, wherein each of the plurality of icons represents an element of the install program, defining the install program by placing and arranging the plurality of icons onto a workspace to obtain a defined install program, and building the install program based on the defined install program.

In general, in one aspect, the invention relates to a computer system to generate an install program. The computer includes a processor, a memory, a display device, and instructions stored in the memory. The instructions enable the computer system under control of the processor to select a plurality of icons (wherein each of the plurality of icons represents an element of the install program), define the install program by placing and arranging the plurality of icons onto a workspace to obtain a defined install program, and build the install program based on the defined install program.

In general, in one aspect, the invention relates to an installation builder integrated development environment (IDE). The installation builder IDE includes an installation builder module configured to define and build an install program, and a graphical user interface (GUI) associated with the installation builder module, wherein the GUI comprises a workspace and a plurality of icons, wherein each of the plurality of icons represents an element of the install program, and wherein a user defines the install program by placing and arranging the plurality of icons onto the workspace to obtain a defined install program.

Other aspects and advantages of the invention will be apparent from the following description and the appended claims.

DETAILED DESCRIPTION

Figure 1:
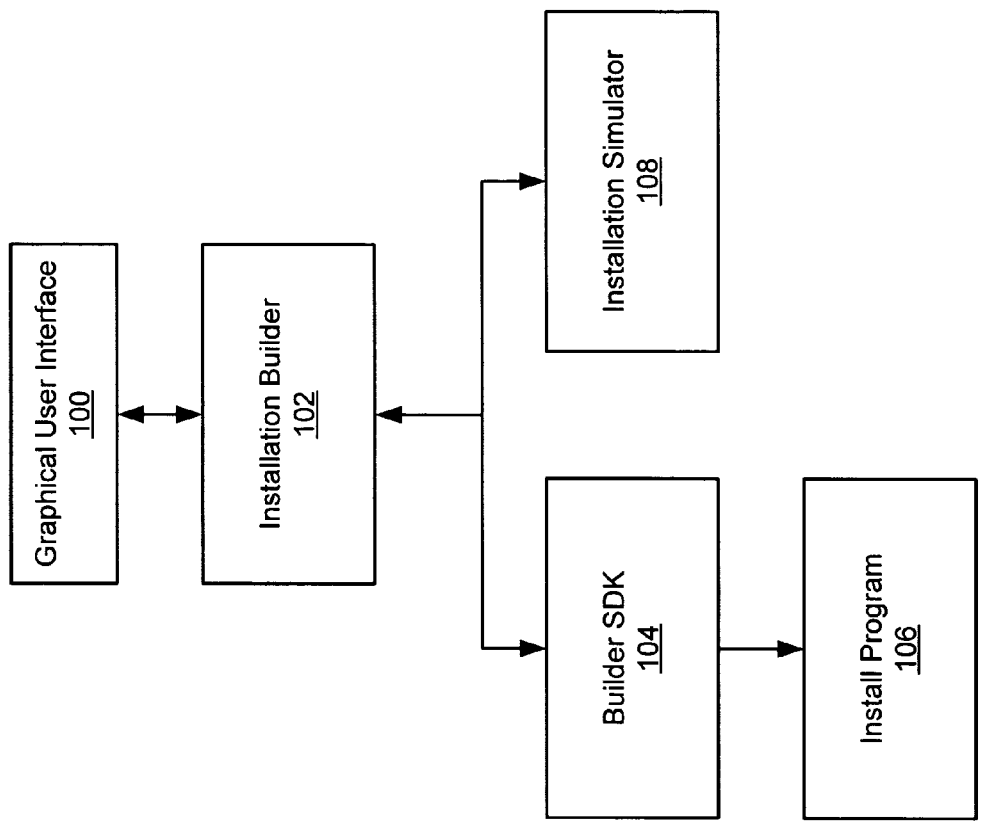
FIGS. 1 and 2 show flow diagrams in accordance with one or more embodiments of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In various embodiments, the present invention provides an integrated development environment (IDE) for building install programs and methods for building install programs. The installation builder IDE includes a drag-and-drop graphical user interface permitting visual development of an install program and an installation simulator permitting a user to observe the interactions of the elements of an install program before creating the final product. In addition, the installation builder IDE includes support for multiple users working on a single install program and for creating install programs for enterprise applications.

FIG. 1 shows a flow graph of an installation builder IDE in accordance with one or more embodiments of the invention. The installation builder IDE includes a graphical user interface (100), an installation builder module (102), a builder software development toolkit (SDK) (104), and an installation simulator (108). These components of the installation builder IDE interact with input from a user or users to create an install program (106).

The builder SDK (104) includes functionality to create an install program (106). This functionality includes the panels, rules, and actions that may be used in the definition of an install program (106) as well as functionality to define the components of the application(s) to be installed and the relationships of these components. The functionality in the builder SDK (104) is used by other install modules (e.g., installation builder (102)) to define and interrelate the panels, actions, and rules defining the flow of a desired install program (i.e., 106), to define and interrelate the components of the application(s) to be installed, and to assemble the panels, actions, rules, and application components into an install program (106). The builder SDK (104) also includes an application programming interface (API) used by other installation modules (e.g., installation builder (102)) to access the functionality of the builder SDK (104). In one embodiment, the builder SDK provides the functionality and the API as described in "JSR 38: Application Installation API Specification" available from the Java Community Process organization.

The installation builder module (102) includes functionality to manage the creation of an install program (106). This module presents users of the installation builder IDE with a graphical user interface (GUI) (100) through which the users may define, simulate, and ultimately assemble a desired install program (106). The installation builder module (102) interacts with the builder SDK (104) through the published API to retrieve and display building options responsive to user interaction through the GUI (100) and to translate input from the users into the appropriate API calls to store the state of an install program (106) as it is defined.

In one embodiment, the installation builder module (102) includes functionality to interface to an installation simulator (108). This functionality sends user commands entered via the GUI (100) to the installation simulator (108) and causes the GUI (100) to display the output of the simulation of the install program (106).

Still referring to FIG. 1, the installation simulator (108) simulates the flow of an install program (106). The installation simulator (108) allows users of the IDE to observe the behavior of and interact with an install program (106) during the development process. At any point during development, a user may use the installation simulator (108) to simulate the behavior of an install program (106) as currently defined. The installation simulator (108) presents the panels of the install program (106) in the order defined and simulates the execution of any actions and rules.

The graphical user interface (GUI) (100) provides a drag-and-drop interface for creating an install program (106). The GUI (100) utilizes icons to represent the individual elements or objects, e.g. panels, actions, and checks, used to construct an install program (106). To create an install program (106), a user drag and drop these icons onto the IDE workspace, interconnecting the icons to graphically represent the flow of the desired install program (106). The flow of the install program (106) may be changed by changing the positions of the icons on the screen or redirecting the interconnections. In one embodiment, the individual elements may be modified by clicking on the icons and editing property sheets (i.e., windows in which users can change the properties of elements) that are presented.

Figure 2:
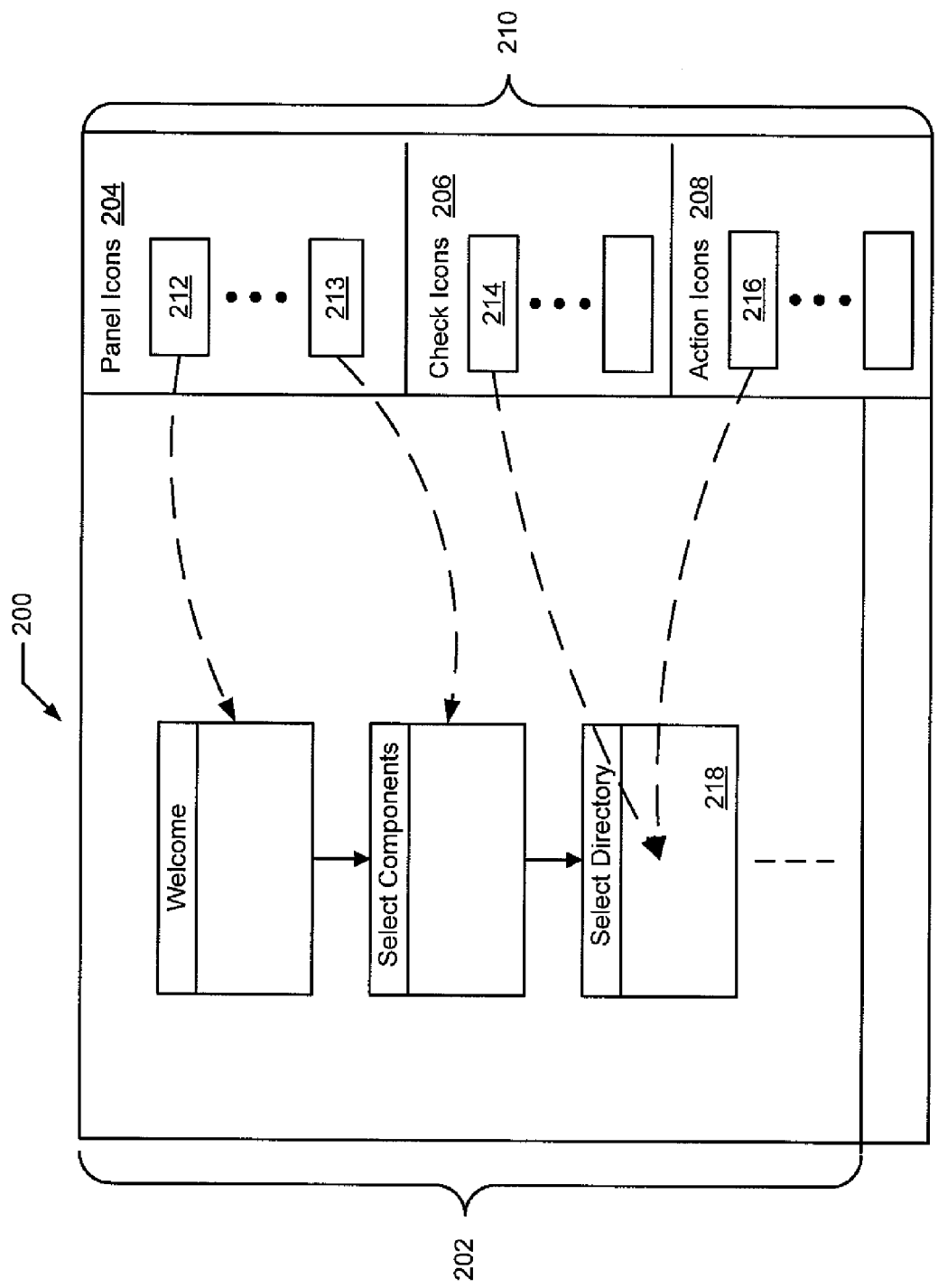

FIG. 2 shows a flow graph of a drag-and-drop GUI for an installation builder IDE in accordance with one embodiment of the invention. During the definition of an install program, a screen (200) with a workspace (202) and a toolkit area (210) is presented to a user. The workspace (202) is used to create and present a visual representation of an install program definition. The toolkit area (210) may include graphical tools and icons available to the user for creating the visual representation, such as groupings of panel icons (204), check icons (206), and action icons (208). These icon groupings contain icons representing the panels, checks, and actions, respectively, available for defining an install program.

The user defines the flow of the panels to be displayed in the desired install program by selecting a panel icon (212) from the panel icons (204) in the toolkit area (210). Next, the user drags the selected panel icon (212) and drops it into the desired location within the workspace (202). The user may add additional panel icons (e.g., 213) to the workspace in a similar manner, interconnecting the panel icons to define the flow sequence. At any time during development, the user may attach checks and actions to the panels to add additional behavior to the desired install program by dragging and dropping check icons (214) and action icons (216) onto a panel (218) in the workspace (202) and arranging these icons in the order that the checks and actions should occur. For example, the user may add an action icon (216) to a directory selection panel (218) to create a directory and a check icon (214) to determine whether the directory already exists before creating the directory.

Referring back to FIG. 1, in one embodiment, an install program (106) is built into an executable file by using the installation builder IDE. This executable file contains everything required to install an application on the computer system or systems including all of the application components to be installed and any text or image files needed by the install program.

In one embodiment, the installation builder IDE includes functionality allowing multiple users to cooperate in the creation of an install program (106). For example, a graphics designer can provide new panel designs, a user from a legal department can add or update a license agreement, and two or more developers can work together to define various aspects of an install program (106).

In one embodiment, the installation builder IDE includes functionality to support the creation of complex install programs (e.g., 106) that may be used to install enterprise applications spanning multiple servers. Installing complex enterprise applications involves installing an application on multiple servers in a very specific order (e.g., the first install is on the web server, then the database, and then the application server). A flow-oriented visual environment assists greatly in properly ordering the install on multiple servers with a precise order by shown an actual representation of the environment using familiar icons.

In one embodiment, the various modules of the installation builder IDE may be installed and used on networked computer systems. For example, the GUI (100) may be installed on the workstations of users while the installation builder (102), the builder SDK (104), and the installation simulator (108) may be installed on one or more servers.

Figure 3:
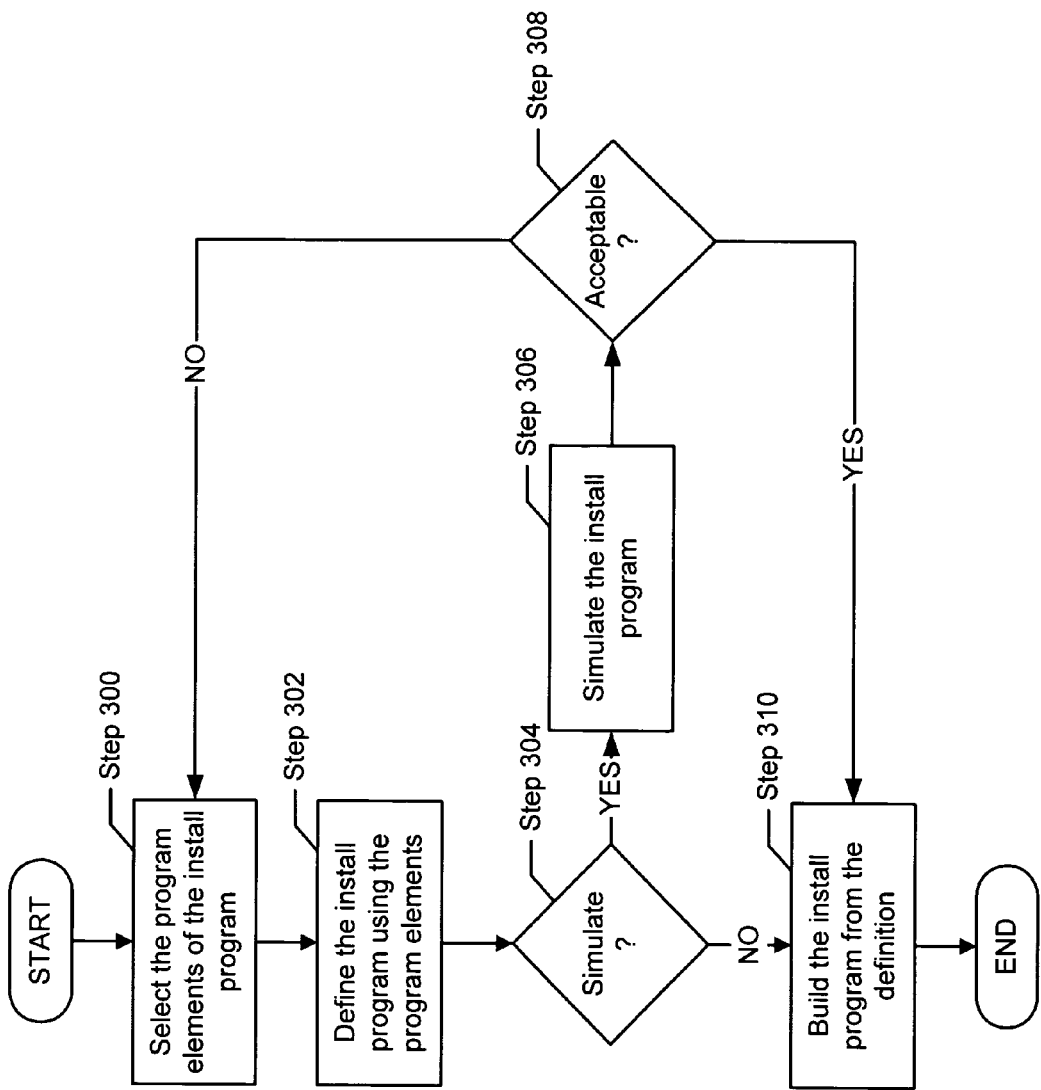
FIG. 3 shows a flowchart in accordance with one or more embodiments of the invention.

FIG. 3 shows a flowchart of a method for creating an install program using an installation builder IDE in accordance with one or more embodiments of the invention. First, program elements (e.g., panel icons, check icons, action icons, etc.) of the install program are selected by a user using a graphical user interface (Step 300). Next, the install program is defined using the selected program elements (Step 302). In one embodiment, a user interacts with a drag-and-drop GUI to place and arrange the selected panel, action, and rule icons to represent the desired flow and behavior of the install program, thus creating the definition. Optionally, a determination is made whether to simulate the defined install program (Step 304). If the decision is made to perform the simulation, then the install program is simulated to observe the behavior and flow before the final install program is built (Step 302). Once the simulation is performed and the result is not acceptable, Steps 300-304 (and optionally Steps 306-308) are repeated. In one embodiment, this simulation can take place at any time and at multiple times during the definition of the install program. If the simulation is not performed or the simulation is found acceptable (308), then the install program is built from the definition (Step 306). More specifically, the install program definition is converted into a stand-alone executable file capable of installing the intended local or enterprise-wide application.

Embodiments of the present invention provide methods and apparatus for defining and simulating install programs. More specifically, embodiments of the invention provide an IDE for creating install programs. Embodiments of the IDE can decrease the time required to develop an install program. The drag-and-drop graphical user interface provides a visual, intuitive way to define the flow and behavior of the desired install program that increases accuracy in development and decreases the time required to define the install program. The simulation capability of the IDE helps potentially decrease the development time for install programs. This simulation capability allows users to simulate the flow and behavior of the install program under development as it is being developed rather than requiring the user to define and assemble the entire install program before testing. The flow of the install program allows easy debugging and multiple users to work together and building complex installers.

Figure 4:
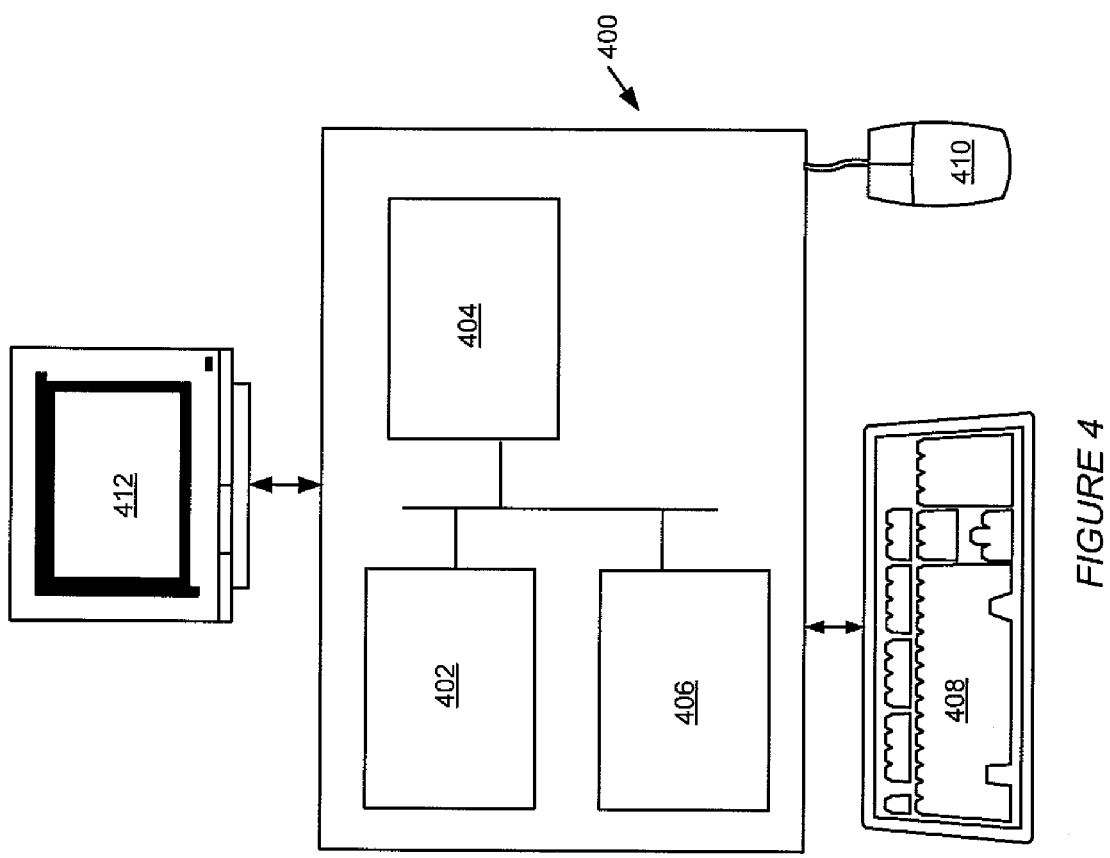
FIG. 4 shows a computer system in accordance with one or more embodiments of the invention.

An embodiment of the invention may be implemented on virtually any type of computer regardless of the platform being used. For example, as shown in FIG. 4, a computer system (400) includes a processor (402), associated memory (404), a storage device (406), and numerous other elements typical of today's computers (not shown). The computer (400) may also include input means, such as a keyboard (408) and a mouse (410), and output means, such as a monitor (412). The computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method for creating an install program comprising:

dragging a plurality of icons for the install program from a toolkit pane to a workspace pane to create an arrangement of a plurality of program elements, wherein each of the plurality of icons represents an element of the install program, wherein the install program is a program for installing an application on a computer system, wherein the plurality of icons comprises a panel icon, an action icon, and a rule icon, wherein the panel icon represents a panel which defines a screen to display during installation of the application, wherein the action icon represents an action which defines an installation function of the panel icon, and wherein the rule icon represents a rule which defines a check to perform before the installation function is performed;

simulating the install program prior to building the install program into an executable file; and building the install program into an executable file according to the arrangement to create the install program.

2. The method of claim 1, wherein the application is an enterprise application.

3. The method of claim 1, wherein the install program is created by multiple users.

4. The method of claim 1, wherein the install program is created within an integrated development environment.

5. A computer storage medium comprising instructions recorded thereon executable by a processor to create an install program, the instructions for:

receiving a command of dragging a plurality of icons for the install program from a toolkit pane to a workspace pane to create an arrangement of a plurality of program elements, wherein each of the plurality of icons represents an element of the install program, wherein the install program is a program for installing an application on a computer system, wherein the plurality of icons comprises a panel icon, an action icon, and a rule icon, wherein the panel icon represents a panel which defines a screen to display during installation of the application, wherein the action icon represents an action which defines an installation function of the panel icon, and wherein the rule icon represents an action which defines a check to perform before the installation function is performed;

simulating the install program prior to building the install program into an executable file; and building the install program into an executable file according to the arrangement to create the install program.

6. The computer-readable medium of claim 5, wherein the application is an enterprise application.

7. The computer-readable medium of claim 5, wherein the install program is created by multiple users.

8. The computer-readable medium of claim 5, wherein the install program is created within an integrated development environment.

9. A computer system to generate an install program, comprising:
- a processor;
- a memory;
- a display device, and
- instructions stored in the memory for enabling the computer system under control of the processor, to:
  - receive a command of dragging a plurality of icons for the install program from a toolkit pane to a workspace pane to create an arrangement of a plurality of program elements, wherein each of the plurality of icons represents an element of the install program, wherein the install program is a program for installing an application on a computer system,
  - wherein the plurality of icons comprises a panel icon, an action icon, and a rule icon, wherein the panel icon represents a panel which defines a screen to display during installation of the application, wherein the action icon represents an action which defines an installation function of the panel icon, and wherein the rule icon represents a rule which defines a check to perform before the installation function is performed;
  - simulate the install program prior to building the install program into an executable file; and
  - build the install program into an executable file according to the arrangement to create the install program.

* * * * *